United States Patent [19]

Mueller, Jr. et al.

[11] 4,206,813

[45] Jun. 10, 1980

[54] DRAFT SENSING APPARATUS

[75] Inventors: Otto Mueller, Jr., Detroit; Lee E. Elfes, Bloomfield Hills, both of Mich.

[73] Assignee: Massey-Ferguson Inc., Detroit, Mich.

[21] Appl. No.: 930,476

[22] Filed: Aug. 2, 1978

[51] Int. Cl.² .......................................... A01B 63/112
[52] U.S. Cl. ................................................ 172/7
[58] Field of Search ..................... 172/7, 8, 9, 10; 280/446 A; 73/141 A

[56] References Cited

U.S. PATENT DOCUMENTS

| | | | |
|---|---|---|---|
| 3,888,315 | 6/1975 | Elfes et al. | 172/7 |
| 3,960,228 | 6/1976 | Nordstrom | 73/141 A X |
| 3,992,933 | 11/1976 | Randolph, Jr. | 73/141 A |

*Primary Examiner*—Richard T. Stouffer
*Attorney, Agent, or Firm*—John C. Thompson

[57] ABSTRACT

An improved tractor draft sensing mechanism of a special construction so designed that it will transmit only draft signals to the tractor draft control linkage. The mechanism includes a rigid sensing arm hinged at one end to a mounting clamp disposed about a bendable shaft, the mounting clamp being provided with set screws which contact a surface of a housing to resist relative rotational movement of the mounting clamp about the bendable shaft.

8 Claims, 5 Drawing Figures

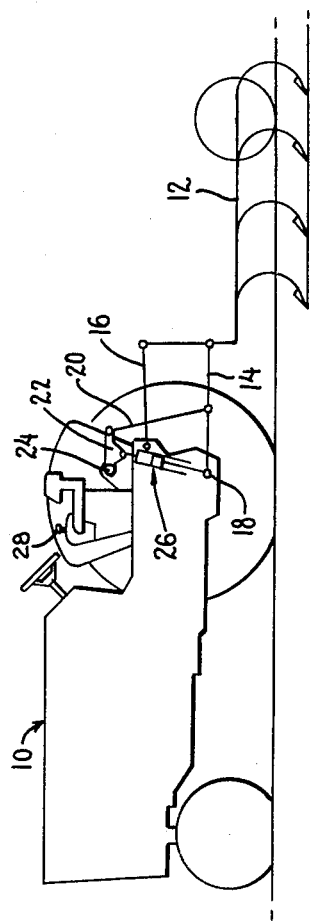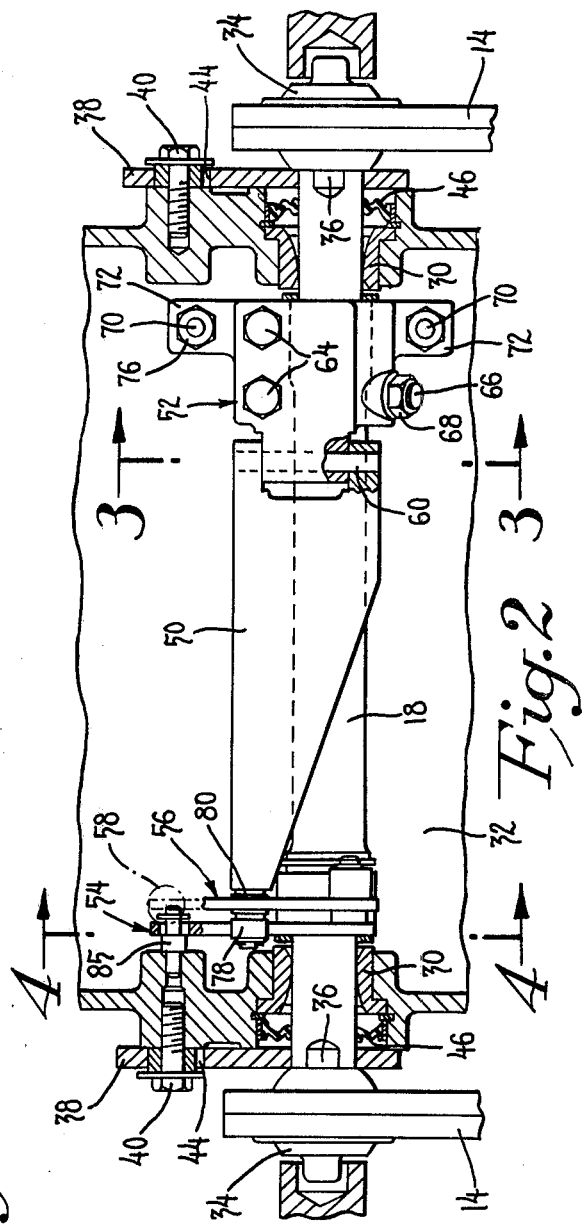

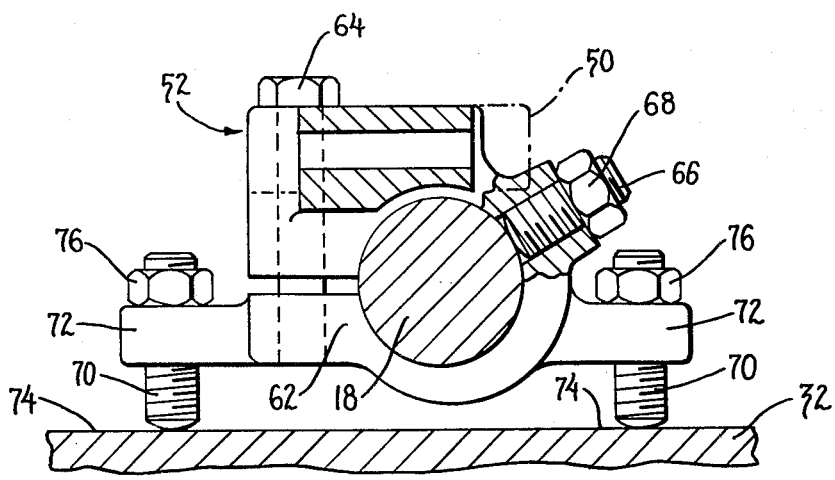
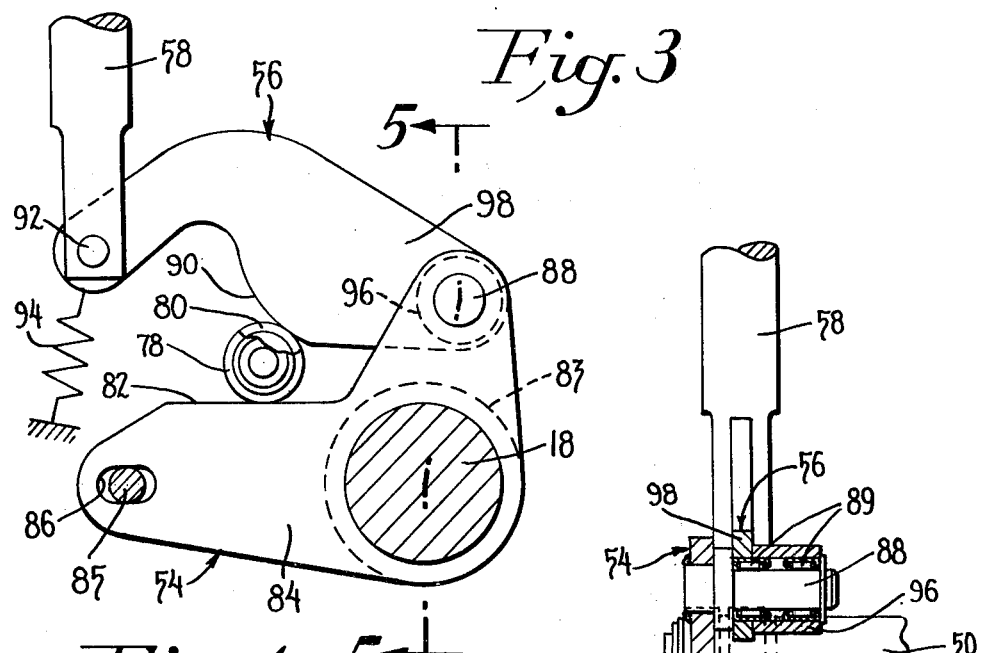
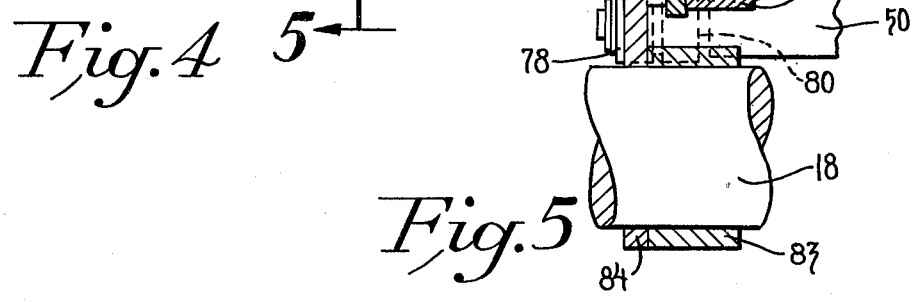

DRAFT SENSING APPARATUS

CROSS REFERENCE TO RELATED APPLICATIONS

The present invention relates to improvements in draft sensing apparatus of the type shown in U.S. Pat. Nos. 3,812,916, 3,888,315 and U.K. patent applications Ser. No. 24,606, filed May 30, 1978, and may be used with draft control linkage of the type illustrated in U.S. Pat. No. 3,901,322 and copending U.S. application Ser. No. 751,551 now U.S. Pat. No. 4,108,248.

TECHNICAL FIELD

The present invention relates generally to a draft sensing apparatus for sensing the draft on the hitch of a tractor, and more particularly to a draft sensing apparatus for sensing and indicating the draft imposed upon an elongated bendable shaft by a tractor three-point hitch, the shaft being mounted in a tractor and extending transversely to the direction of travel.

PRIOR ART

Tractors, particularly of the agricultural type, generally utilize a vertically shiftable three-point hitch linkage for coupling an implement to the tractor. A draft sensing apparatus is customarily employed which measures the draft load between the implement and the tractor and acts through a draft control linkage system to raise or lower the hitch and implements mounted thereon so as to maintain a substantially constant preset draft load. Various means of sensing the draft forces have been employed including having either the upper or the lower links connected to the tractor through a resilient member. One such resilient member may be a transversely extending elongated shaft supported in spaced apart fulcrum supports, the forward end of the lower draft linkage being secured to end portions of the shaft. A sensing arm may be coupled to the shaft, bending movement of the shaft causing corresponding movement of the sensing arm. A measuring device can be utilized to sense the movement of a portion of the sensing arm.

The draft forces which are to be measured are generally parallel to the forward direction of the tractor. However, other forces are present which may also cause movement of the shaft which will in turn cause movement of the sensing arm. These forces can be at a right angle to the draft forces, or they can be rotation forces caused by rotation of the shaft.

When the linkage members are connected to an implement at a point spaced from the lifting point on the links there are reaction forces on the linkage pivot points that have both vertical and horizontal forces. The vertical forces are primarily due to the resultant implement weight and soil suction forces while the horizontal forces (which are parallel to the forward direction of the tractor) are primarily due to the draft of the implement. Since it is the changes in the draft forces that are useful indicators to control the vertical position of the linkage in order to maintain essentially constant draft loads, it is desirable to eliminate the effect of the vertical forces in any load sensing apparatus.

In U.S. Pat. No. 3,888,315 issued June 10, 1975 a draft sensing apparatus has been disclosed which includes a bendable cross shaft having one end of a sensing arm secured thereto at a location to one side of the middle of the bending shaft. As the shaft is caused to be bent due to draft loads imposed upon it, the other end of the sensing arm will be shifted. In accordance with the patent, the other end of the sensing arm is guided in an linear path by a slot. This has been possible by making the sensing arm relatively thin so that it may flex when vertical forces are imposed on the bendable shaft.

While the design shown in U.S. Pat. No. 3,888,315 is a substantial improvement over earlier designs, such as that shown in U.S. Pat. No. 3,812,916 issued May 28, 1974, in certain conditions usually associated with light draft implements it will not perform entirely satisfactorily. Thus, in the event that there are frictional forces which would resist the movement of the free end of the sensing arm the sensing arm may flex to a limited extent. In this event, the changes in the draft load will not be transmitted to the draft control linkage.

A further disadvantage of the prior art construction illustrated in the U.S. Pat. No. 3,888,315 is that a false draft signal may be transmitted to the draft control linkage in the event the sensing shaft rotates. Thus, as the shaft may rotate the end of the sensing arm remote from the shaft will be moved towards or away from the shaft as it is constrained for movement in one plane only.

OBJECT AND SUMMARY OF THE INVENTION

It is the principal object of the present invention to provide a draft sensing apparatus including a sensing arm assembly mounted on a bendable shaft so constructed that changes in the draft force will always be transmitted through the sensing arm assembly to the measuring device and associated draft control linkage and which will not transmit other movements of the bendable shaft such as rotational movements or bending movements out of the plane of the draft forces.

More particularly, it is an object of the present invention to provide a sensing arm assembly mounted upon a bendable and rotatable shaft in such a manner that the sensing arm assembly cannot rotate in the event of rotation of the bending shaft.

It is a further object of this invention to provide a rigid sensing arm hinged to a mounting clamp which secures the arm to a bendable shaft the rigid sensing arm construction insuring that all movements of the mounting clamp caused by changes in the draft forces will be transmitted to the measuring device, and the hinge insuring that other movements of the mounting clamp will not be transmitted to the measuring device.

The foregoing objects, and other objects which will be apparent to those skilled in the art are achieved by providing a novel sensing arm and mounting clamp construction which is mounted on an elongated bendable shaft which is in turn mounted in spaced apart fulcrum supports in a tractor housing, the elongated shaft supporting at opposed ends draft links. The elongated shaft is bent within its elastic limits in response to changes in the loads on the draft links. A clamp is secured about the elongated shaft and is provided with structure which is guided on the tractor housing to prevent rotation of the clamp in the event that the elongated shaft rotates. In addition, one end of a rigid sensing arm (which may be a casting) is hinged to the mounting clamp, the other end of the sensing arm being guided along a surface which lies in the plane of the draft forces which are to be sensed.

The foregoing structure will become more apparent after a consideration of the following detailed description taken in conjunction with the accompanying drawings in which a preferred form of this invention is illustrated.

BRIEF DESCRIPTION OF THE FIGURES

FIG. 1 is an outline of a tractor, hitch and implement combination on which this invention can be applied.

FIG. 2 is a general cross-sectional view, taken along a horizontal line, and showing the draft sensing apparatus of this invention along with its mounting on the tractor.

FIG. 3 is an enlarged sectional view taken along the line 3—3 in FIG. 2.

FIG. 4 is another enlarged sectional view taken along the line 4—4 in FIG. 2.

FIG. 5 is a sectional view taken along the line 5—5 in FIG. 4.

DETAILED DESCRIPTION

Referring now to FIG. 1, a tractor, indicated generally at 10 is shown interconnected with a semi-mounted implement such as a plow 12 by a conventional three-point hitch including lower draft links 14 and an upper link 16. The forward ends of the links 14 are pivotally secured to an elongated bendable cross shaft 18 (more fully illustrated in FIG. 2) carried by the tractor. The forward end of the upper link 16 is also pivotally secured to the tractor. The lower links may be raised and lowered by means of lift links 20, the upper ends of which are connected to lift arms 22 which are in turn secured to a rock shaft 24. The lift arm can be moved upwardly and downwardly by a single acting hydraulic cylinder assembly 26. The position of the hydraulic cylinder assembly is controlled by a valve (not illustrated) which causes fluid to be introduced or discharged from the cylinder assembly in response to various command and feedback signals. Thus, the tractor operator may set a draft command signal through movement of the control lever 28. For example, if the draft control lever 28 is moved in a forward direction it will transmit a command signal to the valve to increase the draft and the fluid within the cylinder assembly 26 will be exhausted causing the implement 12 to lower. A draft feedback system is provided which will shift a valve spool in the valve to its centered position once the desired draft has been obtained. The draft feedback system includes the draft sensing apparatus of this invention as well as a known draft control linkage.

The novel draft sensing apparatus of this invention is illustrated in FIGS. 2-5. In FIG. 2 the lower links 14 are shown supported on the ends of the shaft 18 which is, in turn, supported by fulcrum supports in the form of bearings 30 within the tractor housing or frame 32. The shaft 18 has reduced end portions which receive ball joints 34 carried by the front end of the lower links. Inwardly of each of the ball joints the shaft is provided with flats 36 which are engaged by plates 38 which are in turn secured to the housing 32 by bolts 40 and bushings 42 which pass through elongated horizontally extending slots 44. An oil seal 46 of conventional construction is disposed in a recess between each of the bearings 30 and the associated plate 38.

Mounted within the housing are various components of the draft sensing apparatus, these components including a sensing arm 50, a sensing arm mounting clamp indicated generally at 52, a guide plate assembly indicated generally at 54, and a measuring means or cam assembly indicated generally at 56, one end of which is secured to the lower end of a vertically shiftable rod 58, the other end being interconnected with a draft control linkage. The sensing arm 50 is a metal casting which is relatively thick as can be seen from FIG. 5. One end of the arm 50 is provided with aligned apertures which receive a dowel pin 60, which pin passes through a corresponding aperture in the mounting clamp 52 and acts to hingedly interconnect the arm 50 with the clamp 52. The dowel pin 60 is generally parallel to the draft forces which are to be measured. The mounting clamp 52 is best illustrated in FIG. 3 and includes a C-shaped section 62 which may be slipped over the shaft 18 when the shaft is being installed within the tractor housing 32, the section 62 being secured to the shaft 18 by bolts 64. A further threaded member 66 bears against another portion of the shaft 18 to insure that the clamp will not move relative to the shaft 18. This threaded member or set screw 66 is locked in place by a nut 68. When installing the sensing arm mounting clamp 52 after the shaft 18 has been disposed in its desired position set screws 70 carried by front and rearwardly extending flanges 72 of the clamp are screwed down until they contact the surface 74 of the housing 32 in such a manner that the dowel pin 60 is parallel to the draft forces which are to be measured. The bolts 64 will then be tightened and the set screws 70 will then be adjusted again to maintain their contact with the surface 74. The set screws 70 will be locked in place by nuts 76. At this point it should be noted that the bolts 64 and set screw 66 are only tightened enough to insure that the clamp will not normally move relative to the shaft 18. However, in the event that the shaft should tend to rotate within the bearings 30, which event may occur when raising or lowering implement under load, the shaft will rotate within the C-shaped section 62 as the clamp 52 will be constrained from rotational movement due to the contact of the set screws 70 with the surface 74 of the housing 32.

The other end of the sensing arm 50 carries a pair of spaced apart rollers 78,80. The roller 78 rides along the surface 82 of guide plate 54, the surface 82 being parallel to the draft forces which are to be measured. As can be seen from FIG. 5 the guide plate assembly 54 includes a hub 83 welded to a plate 84, the hub and plate being journaled about the shaft 18. The plate 84 is held from rotation by a pin 85 which passes through an elongated slot 86 in the plate, the pin in turn being supported by the housing 32. The elongated surfaces of the slot 86 are also parallel to the draft forces which are to be measured.

An upper portion of the guide plate 84 carries a pin 88 which is welded to the plate and is generally parallel to the shaft 18. The cam 56 is rotatably supported on the pin 88 by needle bearings 89 and has a lower surface 90 which is adapted to engage the other roller 80. The end of the cam 56 remote from the plate 88 is secured to the vertically shiftable rod by a pin 92 or the like. The cam 56 is biased downwardly into contact with the roller 80 by means of a spring which is illustrated schematically at 94. In actual practice the spring is part of the draft control linkage and valve assembly and biases the rod downwardly. The cam assembly 56 includes a hub 96 welded to a plate 98.

In operation as the loading on the ball joints 34 vary due to changes in the draft on an implement and other factors the bar 18 will tend to bend or bow about the fulcrums 30. If the only forces acting on the balls 34 are draft forces, which draft forces would be parallel to the surface 82, it can be seen that the mounting clamp would move along the surface 74 which is also generally parallel to the surface 82 and hinge pin 60. This movement will always be transmitted to the vertically shiftable rod 58 by the rigid arm 50. In the event that forces at right angles to the draft forces are imposed upon the ball joints, corresponding movement of the bendable shaft will not cause false readings as the mounting clamp 52 can swing upwardly without causing accompanying motion of the rollers 78 due to the hinged construction. In the event that the shaft 18 should rotate, such rotational movement is not transmitted into the sensing arm assembly as the mounting clamp 52 acting through the set screws 70 will prohibit the mounting clamp and sensing arm from rotational movement. The hinge 60, the surface 82, the surface 74, and the spring force in cooperation with the rigid construction of the arm 50, act to maintain the roller 78 in contact with the surface 82 and insure that the roller 80 will move in response to the bending of the shaft 18, but only along the prescribed surface determined by the surface 82, and additionally, only when the bending of the shaft is caused by changes in the draft forces.

What is claimed is:

1. A draft sensing apparatus comprising: a tractor housing having spaced apart fulcrum supports; an elongated bendable shaft mounted in the spaced apart fulcrum supports; draft members connected to said shaft at points spaced outwardly of said tractor housing and operable to cause said shaft to bend when transmitting forces to said shaft; an elongated sensing arm assembly having a free end and another end which is mounted on said elongated bendable shaft; and means for measuring the relative movement of said free end of the sensing arm assembly; said sensing arm assembly including means acting in cooperation with the measuring means to insure that the free end of the sensing arm assembly will move in a prescribed path in response only to the bending of the shaft caused by changes in the draft forces which are to be measured and being free of response to the bending of the shaft caused by changes in forces other than the draft forces which are to be measured.

2. The draft sensing apparatus set forth in claim 1 in which the sensing arm assembly includes a sensing arm and a mounting clamp secured to the elongated bendable shaft, one end of the sensing arm being interconnected to the mounting clamp.

3. The draft sensing apparatus set forth in claim 2 in which the mounting clamp is secured to the elongated bendable shaft at a location to one side of the center of the shaft.

4. The draft sensing apparatus set forth in claim 2 in which the mounting clamp is guided on the tractor housing to resist rotational forces which may be imposed during rotation of the elongated bendable shaft.

5. A draft sensing apparatus comprising: a tractor housing having spaced apart fulcrum supports; an elongated transversely bendable shaft mounted in the spaced apart fulcrum supports; draft links connected to said shaft at points spaced outwardly of said housing and operable to cause the shaft to bend when transmitting forces to the shaft; a clamp disposed about said shaft within said housing; a sensing arm, one end of which is carried by said clamp and having another end disposed away from said clamp; means for measuring relative movement of said another end of the sensing arm in response to bending of the shaft; characterized by said clamp including means guiding the clamp on said tractor housing in such a manner that the clamp resists rotational movement imposed upon it by said shaft, said guiding means preventing said one end of the sensing arm from rotating about the axis of the shaft relative to the housing.

6. The draft sensing apparatus set forth in claims 4 or 5 wherein the mounting clamp is provided with forwardly and rearwardly extending flanges, each of said flanges being provided with vertically extending threaded apertures which receive set screws, each of said set screws also being provided with a lock nut disposed above said flange.

7. The draft sensing apparatus set forth in claims 2 or 5 in which the sensing arm is rigid and is interconnected to the mounting clamp by a hinge construction which permits vertical movement of said one end of the sensing arm in a plane perpendicular to the draft forces which are to be measured without causing corresponding movement of the other end of the sensing arm.

8. The draft sensing apparatus set forth in claim 7 in which the hinge is generally parallel to the draft forces.

* * * * *